United States Patent

Payne

[15] 3,648,686
[45] Mar. 14, 1972

[54] AUDIBLE PSYCHOGALVONOMETER

[72] Inventor: Burlyl R. Payne, 31 Townsend Terrace, Framingham, Mass. 01701

[22] Filed: July 3, 1969

[21] Appl. No.: 839,033

[52] U.S. Cl. ..............................128/2.1 R, 35/22, 273/1 E
[51] Int. Cl. .........................................................A61b 5/05
[58] Field of Search..................128/2.1, 2.06; 35/22; 272/1 E

[56] References Cited

UNITED STATES PATENTS

| | | | |
|---|---|---|---|
| 1,761,476 | 6/1930 | Hathaway | 128/2.1 |
| 2,308,933 | 1/1943 | Raesler | 128/2.1 |
| 2,339,579 | 1/1944 | Milne et al. | 128/2.1 |
| 2,657,683 | 11/1953 | Koller | 128/2.1 |
| 2,661,734 | 12/1953 | Holzer et al. | 128/2.1 |
| 2,712,975 | 7/1955 | Golseth et al. | 128/2.1 |
| 2,736,313 | 2/1956 | Mathison | 128/2.1 |
| 2,829,638 | 4/1958 | Douglas | 128/2.1 |
| 3,207,151 | 9/1965 | Takagi | 128/2.1 |
| 3,316,897 | 5/1967 | Weidinger et al. | 128/2.06 |
| 3,426,150 | 2/1969 | Tygart | 128/2.06 X |

Primary Examiner—Richard A. Gaudet
Assistant Examiner—Kyle L. Howell
Attorney—Wolf, Greenfield and Sacks

[57] ABSTRACT

A psychogalvonometer includes a pair of electrodes for sampling the galvanic skin response of a subject. The electrodes couple to an amplifier and oscillator circuit which responds to the resistive condition sampled by the electrodes. The oscillator circuit includes a spear which emits an audio signal in response to the electrical signal generated by the oscillator.

4 Claims, 3 Drawing Figures

Patented March 14, 1972

3,648,686

INVENTOR
Buryl R. Payne
BY
Wolf, Greenfield Hieken + Sacks

AUDIBLE PSYCHOGALVONOMETER

BACKGROUND OF THE INVENTION

The present invention relates in general to an instrument for measuring sympathetic nervous system activity and more particularly concerns a novel instrument for measuring the galvanic skin response of high electrical performance and small physical form which is relatively inexpensive to fabricate in large and small quantities with uniformly high quality.

In the well known types of instruments for measuring sympathetic nervous system activity, elaborate processing and read-out circuitry are used. While these instruments may perform satisfactorily, they are large, frequently unwieldly, and expensive. Because of these limitations such prior art apparatus have limited utility and application.

SUMMARY OF INVENTION

Accordingly, it is an objection of this invention to provide an instrument for measuring sympathetic nervous system activity which is relatively easy and inexpensive to fabricate.

It is another object of the invention to provide an instrument for measuring sympathetic nervous system activity in a compact, efficient package capable of reproduction in large or small quantities.

It is another object of the invention to provide an instrument for measuring a particular sympathetic nervous system activity called galvanic skin response.

It is another object of the invention to provide an instrument for measuring sympathetic nervous system activity which will provide a variable pitch audible feedback either to the subject or to the operator.

It is another object of the invention to provide an instrument for measuring sympathetic nervous system activity which may be used in a variety of forms as a game or toy for indicating the galvanic skin response of the players.

It is another object of the invention to provide an instrument for measuring sympathetic nervous system activity which may be used by a subject as a tension monitor or an aid in helping him relax.

A further object of the invention to provide a method of measuring galvanic skin response and which is suitable for operation as a game or toy and is capable of being mass produced at low cost.

According to the invention electrodes sample electric skin resistance of the subject whose sympathetic nervous system activity is to be measured. The electrodes are coupled to an electronic circuit which includes an audio oscillator. The audio oscillator generates an electrical signal the frequency of which is dependent upon the variable resistance sampled by the electrodes. The electrical signal is then converted into a variable pitch audible signal by a speaker so that a measure of sympathetic nervous system activity may be discerned.

In a modification of the present invention, there are two sets of electrodes sampling the galvanic skin response of two separate subjects. The two sampled resistances are compared and the audio oscillator yields an electrical signal representative of the comparison thus achieved. The electrical signal is then converted into an audible signal of varying pitch as above so that the subjects may discern relative sympathetic nervous system activity.

BRIEF DESCRIPTION OF THE DRAWINGS

Other features, objects and advantages of the present invention will be more clearly understood when considered in conjunction with the accompanying drawings in which.

DETAILED DESCRIPTION OF PREFERRED EMBODIMENTS

Figure 1:
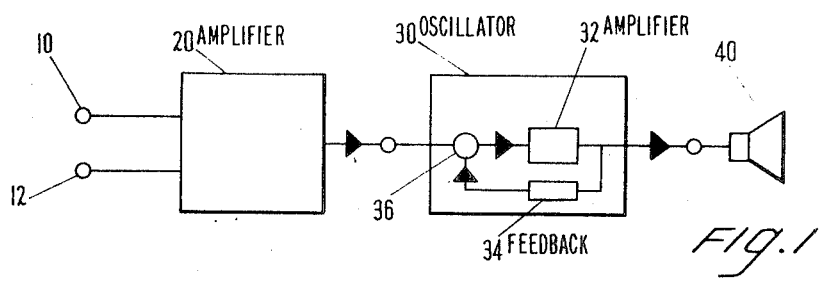
FIG. 1 is a block diagram illustrating the logical arrangement of the apparatus and the signal flow through the invention.

With reference now to the drawings and more particularly to FIG. 1 thereof, there is shown a block diagram illustrating the logical arrangement of the apparatus and the signal flow through the invention (the signal flow is represented by arrows in the figure). Electrodes 10 and 12 are attached to a subject whose sympathetic nervous system activity is to be measured. The skin resistance sampled by electrodes 10 and 12 provides the operating point for amplifier 20 which yields a DC signal representative of the variable resistance sampled by electrodes 10 and 12. This DC signal provides the input signal for feedback oscillator 30. Feedback oscillator 30 includes base amplifier 32, feedback network 34 and mixing network 36. Feedback oscillator 30 yields an audio signal the frequency of which is representative of the resistance sampled by electrodes 10 and 12. The oscillating signal is converted into an audible signal by speaker 40 that varies in pitch corresponding to varying sympathetic nervous system activity of the subject.

Figure 2:
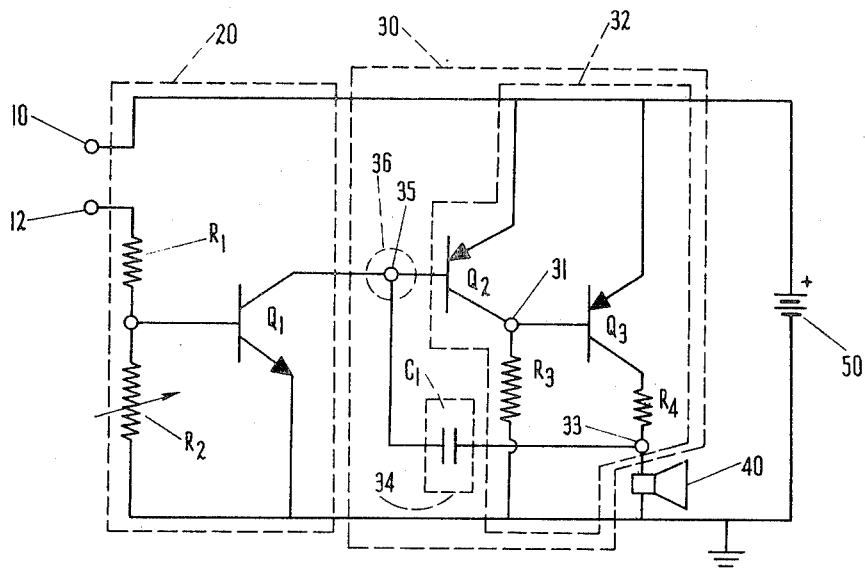
FIG. 2 is a schematic circuit of an embodiment to FIG. 1 further showing the elements of the circuit.

FIG. 2 is a schematic circuit diagram of the embodiment of FIG. 1 further illustrating the elements of the circuit. Electrodes 10 and 12 are securely attached to the subject whose variable sympathetic nervous system activity is to be measured. The variable skin resistance thus measured by the electrodes 10 and 12 is in series combination with resistor $R_1$. This series combination in conjunction with variable resistor $R_2$ sets the operating point for transistor $Q_1$ of the amplifier 20. Transistor $Q_1$ is illustrated in the grounded emitter configuration. The amplified DC signal at the collector of transistor $Q_1$ provides the input signal for feedback oscillator 30. Feedback oscillator 30 includes transistors $Q_2$ and $Q_3$ in cascade. Oscillator 30 is an audio oscillator of the type whose frequency can be varied within the audio range. In the embodiment of FIG. 2, the frequency of oscillator 30 is controlled by transistor $Q_1$. In this embodiment, transistor $Q_1$ is shown as an NPN type and transistors $Q_2$ and $Q_3$ are shown as PNP types. In their cascaded form, the collector of transistor $Q_2$ is coupled to the base of transistor $Q_3$ by terminal 31. Resistor $R_3$ intercouples terminal 31 with ground potential. Also, resistor $R_4$ couples the collector of transistor $Q_3$ with output terminal 33. Capacitor $C_1$ intercouples terminal 33 with the base of transistor $Q_2$ at terminal 35 and provides a portion of the feedback network for feedback oscillator 30. The oscillating output signal of feedback oscillator 30 at output terminal 33 is coupled to speaker 40 which converts that electrical signal to an audible signal susceptible to perception by a human. Battery 50 provides the bias signal for transistors $Q_1$, $Q_2$ and $Q_3$.

Figure 3:
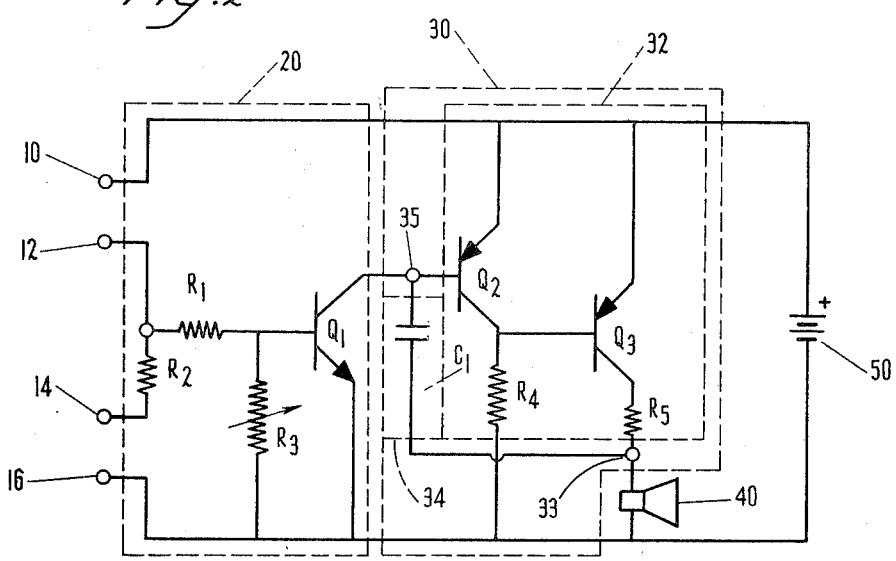
FIG. 3 is a schematic circuit of a modification of the invention illustrating two pairs of electrodes for sampling two subjects.

FIG. 3 is a schematic circuit diagram of a modification of FIG. 2 in which two sets of electrodes are shown. Each pair of electrodes attaches to a subject whose variable sympathetic nervous system activity is to be measured. The skin resistance sampled by electrodes 14 and 16 will be in series combination with resistor $R_2$. This combination, in conjunction with the skin resistance sampled by electrodes 10 and 12, resistor $R_1$ and variable resistor $R_3$ provide the operating point for transistor $Q_1$. Since the skin resistance sampled by the electrodes 10 and 12 and the series combination of resistor $R_2$ and the skin resistance sampled by electrodes 14 and 16 are in parallel combination with respect to the base-to-emitter junction of transistor $Q_1$, changes in either or both of the skin resistances will initially effect the operating point of transistor $Q_1$ and hence the signal level at the collector of transistor $Q_1$. This signal (as in FIG. 2) supplies the input signal for feedback oscillator 30, in the same manner as above. Speaker 40 again yields an audible signal which may be perceived by either or both the subjects or by an independent observer. Battery 50 supplies the bias signal for the circuit. Variable resistor $R_3$ can set the operating point of transistor $Q_1$ and hence the control level of input signal on the feedback oscillator 30. By varying the resistance of variable resistor $R_3$ (and, thus, the quiescent point of amplifier 20) both the intensity and the frequency of the audible signal emitted by speaker 40 may be controlled.

Having described the embodiments and physical arrangement components it is appropriate to consider the values of resistance sampled by the electrodes in determining nervous system activity. The skin resistance, as measured between two fingers of one hand, of a stable, stationary subject is usually in the neighborhood of 100 kilohms. When the subject becomes excited, frightened or disturbed, even to a small degree, his nervous system sends impulses to the sweat glands which then become active. Although not always visible, sweat is produced, skin resistance is lowered and more current is allowed to flow to transistor $Q_1$ of amplifier 20. Conversely, when the subject becomes relaxed the skin resistance is increased and less current is allowed to flow to transistor $Q_1$ of amplifier 20. The values of skin resistance may vary considerably from subject to subject, but approximate values may be given by way of illustration. For an extremely nervous subject a skin resistance of 20 kilohms is not unusual and for an extremely relaxed subject a skin resistance of 200 kilohms is, likewise, not unusual.

In the specific embodiments of this invention a psychogalvonometer with a single pair of electrodes was constructed. The psychogalvonometer measured skin resistances from 20 to 200 $k\Omega$ and utilized three transistors in two stages. The amplifier stage includes a 2N5089 NPN transistor. The electrodes were coupled to the base of the NPN transistor by a 10-kilohm resistor. A 100-kilohm variable resistor connects the base of the NPN transistor with ground potential. The collector of the NPN transistor coupled to the feedback oscillator which included two PNP 2N9614 transistors in cascade. The collector to base interconnection of these cascaded transistors was connected to ground by a 470-ohm resistor. A 15-ohm resistor coupled the output terminal of the feedback amplifier to the collector of the output PNP transistor. In the feedback oscillator, a 0.33-microfarad capacitor coupled the output terminal with the base of the input transistor. An 8-ohm speaker was used to provide the audible output signal. A 3-volt battery was used to supply bias signal for the circuit.

In a specific embodiment of the invention where two pairs of electrodes were used a matching resistor (designated at $R_2$ in FIG. 3) was serially connected with one pair of electrodes. Another resistor (designated at $R_1$ in FIG. 3) intercoupled the base of transistor $Q_1$ with the interconnection of the electrode arms. Both these resistances may have a value between 100 $k\Omega$ and 5 $k\Omega$. Moreover, resistor $R_2$ may be variable so as to provide an initial set point for operation wherein the measuring legs attached to subjects are matched to one another.

An important feature of the invention is the small physical size and relative durability of the invention which is achieved by use of transistor circuitry.

Another important feature of the invention is the adaptability of the psychogalvonometer for measuring various effects of sympathetic nervous system activity. The invention is particularly useful for demonstrating the effects of conditioning, adaption, lie detection, fatigue, the "startle response," muscle tensions, respiration and temperature among others.

Another important feature of the invention is the adaptability of the device to be used as an aid for the teacher of large classes where it is impossible for all students to see a meter, recorder or oscilloscope.

Another important feature of the invention is the adaptability of the device to uses in the home. The invention may be used as a device to help people relax by giving them audible feedback on their actions, thoughts, tensions or feelings which may activate their sympathetic nervous system. The subject would quickly ascertain which minute actions, behaviors, and even thoughts (such as worries or anxious thoughts) produce audible pitch increases and decreases. After such conditioning, the subject would have increased awareness of such cause-effect relationships without the aid of the invention.

Another important feature of the invention is the ease with which changes in skin resistance may be discerned. The information may be conveyed by an audible signal varying in pitch with the skin resistance or by a meter.

Another important feature of the invention is the adaptability of the device for use as a toy or novelty item. The invention may be used, as in a party context, in games involving the element of bluffing, deceit, or of "keeping cool." Players may play against one another (as is shown in FIG. 3) by strongly reacting or not reacting at all to various stimuli which activate their sympathetic nervous system. The invention may be used with a single subject as a player where other players ask him questions (which may be prepared) or give him preprepared stimuli, such as taps of pin pricks. Implementing devices for the invention could be used to administer standard physical stimuli of specific intensities in this context.

The invention may be constructed with virtually any type of electrodes sufficient to sample the skin resistance of a human body. The invention may also be constructed with virtually any number of transistors in the amplifier stage sufficient to activate the feedback amplifier in the manner representative of skin resistance sampled. Moreover the feedback amplifier may be constructed in any manner and with any number of transistors so as to yield an audio signal representative of the skin resistance sampled.

The invention may be constructed with a visual display, such as a meter, for visual indication of galvanic skin response. Moreover, both visual and audible display may be combined in one embodiment.

The invention is shown with a capacitor in the feedback path of the oscillator, but the invention works well with an oscillator of the phase shift or any other type sufficient to yield an audio signal.

Other modifications and uses of and departures from the specific embodiments described herein may be practiced by those skilled in the art without departing from the inventive concepts. Consequently, the invention is to be construed as embracing each and every novel feature and novel combination of features present in or possessed by the apparatus and techniques herein disclosed and are limited solely by the spirit and scope of the appended claims.

What is claimed is:

1. A psychogalvanometer comprising
   electrodes adapted for connection to a subject,
   a source of electrical power coupled to the electrodes and arranged to establish a potential difference between the electrodes,
   means responsive to the current flowing between the electrodes for deriving a signal related to the skin resistance of the subject,
   a variable frequency oscillator,
   means responsive to the derived signal for controlling the frequency of the oscillator whereby the oscillator's frequency is altered by changes in the skin resistance of the subject,
   and means coupled to the oscillator for indicating changes in the oscillator's frequency.

2. An audible psychogalvanometer comprising
   electrodes adapted for connection to a subject,
   a source of direct current connected to the electrodes,
   means responsive to the current flow between the electrodes for deriving a signal related to the skin resistance of the subject,
   a variable frequency audio oscillator,
   means responsive to the derived signal for controlling the frequency of the audio oscillator whereby the oscillator's frequency is altered by changes in the skin resistance of the subject,
   and a speaker connected to the output of the audio oscillator.

3. An audible psychogalvanometer according to claim 2, wherein
   the variable frequency audio oscillator has a feedback capacitor coupling the oscillator's output to its input,
   and the means responsive to the derived signal controls the amplitude of the feedback signal fed through the feedback capacitor to the input of the audio oscillator whereby the frequency of the oscillator is controlled.

4. An audible psychogalvanometer comprising
electrodes adapted for connection to a subject,
a source of direct current,
a resistive network connected to be in series with the electrodes and the source of direct current when the electrodes are attached to a subject,
a variable frequency audio oscillator having a feedback capacitor coupled between the input and output of the oscillator,
a first transistor connected to the input of the audio oscillator, the first transistor shunting the input of the audio oscillator and being connected to the resistive network to cause the frequency of the audio oscillator to change with a change of potential across the resistive network,
and a speaker connected to the output of the audio oscillator.

* * * * *